(12) United States Patent
Fulper et al.

(10) Patent No.: US 10,465,143 B2
(45) Date of Patent: Nov. 5, 2019

(54) PROCESS FOR RECOVERY OF WASTE GEL-MASS FROM SOFTGEL MANUFACTURING PROCESS

(71) Applicant: R.P. Scherer Technologies, LLC, Las Vegas, NV (US)

(72) Inventors: Lester David Fulper, Clearwater, FL (US); Werner Stange, Largo, FL (US); Norton Richard Hart, Clearwater, FL (US); Shawn P. McKee, Seminole, FL (US); Neftali Tosado, Randolph, NJ (US)

(73) Assignee: R.P. Scherer Technologies, LLC, Las Vegas, NV (US)

( * ) Notice: Subject to any disclaimer, the term of this patent is extended or adjusted under 35 U.S.C. 154(b) by 38 days.

(21) Appl. No.: 15/345,669

(22) Filed: Nov. 8, 2016

(65) Prior Publication Data

US 2017/0128376 A1    May 11, 2017

Related U.S. Application Data

(60) Provisional application No. 62/252,759, filed on Nov. 9, 2015.

(51) Int. Cl.
| | | |
|---|---|---|
| *A61K 9/48* | (2006.01) | |
| *B01J 3/00* | (2006.01) | |
| *C10M 175/00* | (2006.01) | |
| *B01J 13/00* | (2006.01) | |
| *C10M 175/06* | (2006.01) | |

(52) U.S. Cl.
CPC .... *C10M 175/0033* (2013.01); *B01J 13/0069* (2013.01); *C10M 175/06* (2013.01)

(58) Field of Classification Search
CPC ........ B01J 13/0069; B01J 13/02; B01J 13/00; C10M 175/0033; C10M 175/06; C10M 175/00; A61K 9/4833; A61K 9/48
See application file for complete search history.

(56) References Cited

U.S. PATENT DOCUMENTS

| | | | |
|---|---|---|---|
| 4,609,403 A | 9/1986 | Wittwer et al. | |
| 5,040,090 A | 8/1991 | Birkle et al. | |
| 5,210,182 A | 5/1993 | Nasrallah et al. | |
| 5,288,408 A | 2/1994 | Schmidt et al. | |
| 5,945,001 A | 8/1999 | Schmidt | |
| 6,361,802 B1 | 3/2002 | Schmidt | |
| 6,419,807 B1 * | 7/2002 | Davies ............... | B01D 17/0208 204/406 |
| 6,726,841 B2 | 4/2004 | Schmidt | |
| 8,731,342 B2 | 5/2014 | Yang et al. | |
| 2002/0070165 A1 | 6/2002 | Schmidt | |
| 2004/0051192 A1 | 3/2004 | Suzuki et al. | |
| 2012/0294975 A1 | 11/2012 | Kim | |

FOREIGN PATENT DOCUMENTS

| | | |
|---|---|---|
| EP | 2218445 A1 | 8/2010 |
| KR | 101463768 B1 | 11/2014 |
| WO | WO9522387 A1 | 8/1995 |
| WO | WO9944727 A1 | 9/1999 |
| WO | WO0029097 A1 | 5/2000 |

OTHER PUBLICATIONS

EP Search Report; dated Dec. 10, 2018 for EP Application No. 16864830.1.
Partial European Search Report; dated Sep. 24, 2018 for EP Application No. 16 86 4830.
International Search Report and Written Opinion; dated Feb. 16, 2017 for PCT Application No. PCT/US2016/060905.
Australian Examination Report; dated Feb. 1, 2019 for AU Application No. 2016354140.
Office Action for Canadian Patent Application No. 3,004,302; dated May 31, 2019.

* cited by examiner

*Primary Examiner* — Irina S Zemel
(74) *Attorney, Agent, or Firm* — Mendelsohn Dunleavy, P.C.

(57) ABSTRACT

A process and system for recovering gel-mass from a gel-mass-containing waste material. The process comprises retrieving the gel-mass-containing waste material from an encapsulation process; melting the retrieved waste material to provide an oil phase and a non-oil phase; retrieving the non-oil phase to produce a recovered gel-mass; and recycling the recovered gel-mass for combination with fresh encapsulating material to provide a combined encapsulating material for use in encapsulating a same lot of the same product which was being encapsulated in the step that produced the gel-mass-containing waste material from which the gel-mass was obtained. The system comprises a heated accumulator for receiving and melting the gel-mass-containing waste material to provide an oil phase and a non-oil phase; a pumping system; an optional mixer; and a control system.

15 Claims, 2 Drawing Sheets

PROCESS FOR RECOVERY OF WASTE GEL-MASS FROM SOFTGEL MANUFACTURING PROCESS

RELATED APPLICATION DATA

This application claims priority to U.S. Provisional Application No. 62/252,759, filed Nov. 9, 2015, the entire disclosure of which is hereby incorporated by reference as if set forth fully herein.

BACKGROUND OF THE INVENTION

1. Field of the Invention

The present invention relates to a system and process to recover gel-mass from a gel-mass-containing waste material. In particular, the invention is directed to a system and process to recover gel-mass from a gel-mass-containing waste material generated by an encapsulation process.

2. Description of the Related Technology

In a typical encapsulation process, a significant amount of gel-mass is lost as waste material. Frequently, this amount approaches 50% or more of the total feed of encapsulating material, depending on the encapsulation process and nature of the product being encapsulated. Considering the substantial cost of the encapsulating material, especially in view of the large amount of gel-mass used, it is clear that the economic consequences of such waste can be significant. To reduce encapsulation costs, manufacturers have developed several processes for recovering gelatin (the major component of most gel-masses) from the waste material generated during the encapsulation process to allow it to be reused in a further encapsulation process.

In addition to gelatin, many other components are present in the gel-mass-containing waste material from the encapsulation process. Among them are solvents (usually water), softening agents, coating oils (as lubricating oils, when desired), and contaminants in the form of residual encapsulated substances, e.g., active ingredients and/or inactive ingredients in the fill. In addition, coloring agents and preservatives may also be present in the gel-mass-containing waste material. Thus, in order to recover the gelatin, these recovery processes propose to remove not only the lubricating oils from the gel-mass-containing waste materials, but also the other components to obtain a relatively pure, reusable gelatin. Particularly important is the removal of the active ingredients from the gel-mass-containing waste material to avoid cross contamination if the gelatin is later used for encapsulating a different product.

Common processes used in the pharmaceutical industry to recover gelatin involve extraction of gelatin from the gel-mass-containing waste material by using various solvents. To date, the most widely used solvents that can separate gelatin from lubricating oils and active ingredients include chlorinated solvents such as, for example, 1,1,1-trichloroethane with naphtha. Other useful solvents including isopropyl alcohol, methyl isobutyl ketone, toluene, hexane, heptane, acetone, and acetone/water mixtures. These solvents often complicate the gelatin recovery process because of the necessity of ultimately removing yet another component, i.e., the solvent itself, from the recovered gelatin. In addition, these solvents also present issues of high cost, disposal problems, and most importantly, environmental concerns that are associated with some of these solvents. An alternative solvent is water, which eliminates some of these problems, but offers only a moderate recovery rate for the gelatin from the gel-mass-containing waste material.

U.S. Pat. No. 5,288,408 discloses a method of recovering gelatin obtained from a waste material of an encapsulation process. More specifically, the process is for recovery and purification of gelatin and softening agents from the waste material. In a preferred embodiment, deionized water is added to the waste material thereby forming an aqueous solution of gelatin and glycerin in a lower aqueous phase which is separated from an upper oil phase that contains the coating/lubricating oil and/or residual active ingredients. The lower aqueous phase is then hot-filtered to remove any remaining traces of lubricating oil or other contaminants. Next the filtrate is vacuum-distilled to remove the water solvent from the filtrate under specific thermal and atmospheric conditions of pressure and humidity until a desired concentration of gelatin is achieved. The relatively pure, concentrated aqueous gelatin solution recovered by this process may be further purified. The further purification may include steps for further removal of dyes, softening agents and active ingredients from the gelatin solution.

U.S. Pat. No. 5,945,001 discloses a process for recovery and purification of gelatin from gel-mass-containing waste material, especially those obtained from the manufacture of soft gelatin capsules. The process includes dissolving gelatin and other water-soluble components of the gel-mass-containing waste material in a solvent such as deionized water to form a gelatin-containing lower solvent phase, which phase separates from an upper oil phase containing most of the remaining components of the gel-mass-containing waste material. The lower solvent phase is then hot-filtered to remove traces of the lubricating oil and particulates mixed in the gelatin mass. Finally, the lower solvent phase is diafiltered to remove the active ingredients, glycerin, and other water-soluble components to provide a relatively pure gelatin solution that is ready for use in encapsulation.

WO 2000/029097 discloses a process for recovery of gelatin from a gel-mass-containing waste material by treatment and separation of a stream of the waste into an aqueous sub-stream and a non-aqueous sub-stream. The method comprises (a) mixing the gel-mass-containing waste material and a solvent under conditions sufficient to form a solvent-based layer with dissolved gelatin and a non-solvent-based layer containing other components not soluble in the solvent, (b) treating the solvent-based layer with a technique selected from liquid:liquid centrifugation, submicro- and microfiltration and coalescers in order to remove traces of the insoluble components from the solvent-based layer to form a liquid containing gelatin having a higher purity. The liquid may be further concentrated by removing at least some of the solvent, solvent-soluble active ingredients, softening agents, dyes and other solvent soluble impurities. WO 1999/044727 discloses a similar process.

The gelatin recovered by any one of these processes may be stored and reused in a later encapsulation process for encapsulating the same product (but a different lot) or for encapsulating an entirely different product. These methods suffer three significant drawbacks. One is that the gelatin may undergo microbial growth and degradation during the storage period. This may be addressed by adding preservatives to the recovered gelatin and/or using various washing/purification processes to ensure purity of the recovered gelatin before reuse. However, such extra processes will increase the cost of recovering gelatin from the waste encapsulating material. The second drawback is that the recovered gelatin poses a cross-contamination risk between the product being encapsulated initially and the product being encapsulated using the recovered gelatin, or if the recovered gelatin is reused for encapsulating the same product, lot traceability may be adversely affected by impurities in the recovered gelatin used to encapsulate the different lot of the same product. The third drawback is that these recovery processes are designed specifically for recovery of gelatin from the gel-mass-containing waste material. While gelatin is presently the most common polymer used in softgel capsule production, newer polymer systems are being introduced that may require significantly different extraction schemes to purify and recover.

The present invention provides a system and a process for recovering the entire gel-mass from a waste material generated by an encapsulation process and re-using the recovered gel-mass in the same encapsulation process, i.e., for encapsulating the same lot of the same product as the encapsulation process in which the waste material was generated. The present invention therefore eliminates the need for storage of the recovered gel-mass and presents no additional risk of microbial growth, degradation, or cross-contamination or loss of lot traceability.

SUMMARY OF THE INVENTION

In one aspect, the present invention provides a process for recovering gel-mass from a gel-mass-containing waste material generated from an encapsulation process that employs an encapsulating material to encapsulate a product. The recycling process includes the steps of: retrieving the gel-mass-containing waste material from the encapsulation process; melting the retrieved waste material to provide a molten waste material including an oil phase and a non-oil phase; retrieving the non-oil phase to be separated from the oil-phase and entrapped air; and combining the non-oil phase (recovered gel-mass) with fresh gel-mass to be used as a encapsulating material in the same encapsulation process to encapsulate the same lot of said product.

In another aspect, the process further comprises a step of detecting a water content of the recovered gel-mass.

In yet another aspect, the process further comprises a step of adding water to the recovered gel-mass to bring a water content of the gel-mass to a desired level that is suitable for re-use of the recovered gel-mass.

In yet another aspect, the process further comprises a step of introducing the gel-mass-containing waste material into a displacement liquid to facilitate separation of the air and oil phase from the non-oil phase. The volume of displacement liquid may be sufficient to melt the gel-mass containing waste material as it traverses through the displacement liquid.

In yet another aspect, the process further comprises a step of filtering the gel-mass using pressure filtration.

In yet another aspect, the present invention provides a system for recovering gel-mass from a gel-mass-containing waste material generated by an encapsulation process that employs an encapsulating material to encapsulate a product. The system comprises a heated accumulator for receiving and melting the gel-mass-containing waste material to provide a molten waste material which includes a non-oil phase and an oil phase; a pumping system comprising at least one pump for transporting the non-oil phase from the heated accumulator to an optional mixer for mixing the gel-mass; and a control system for controlling operation of the system. The pumping system may also transport the recovered gel-mass to a location for combining the recovered gel-mass with fresh gel-mass to be used to encapsulate the same lot of said product.

In yet another aspect, the system further comprises at least one moisture sensor to detect a water content of the gel-mass.

In yet another aspect, the system further comprises a water dosing system for adding water to the recovered gel-mass.

These and other aspects of the invention will be apparent from the detailed description of the invention which follows.

DETAILED DESCRIPTION OF THE PREFERRED EMBODIMENT(S)

Figure 1:
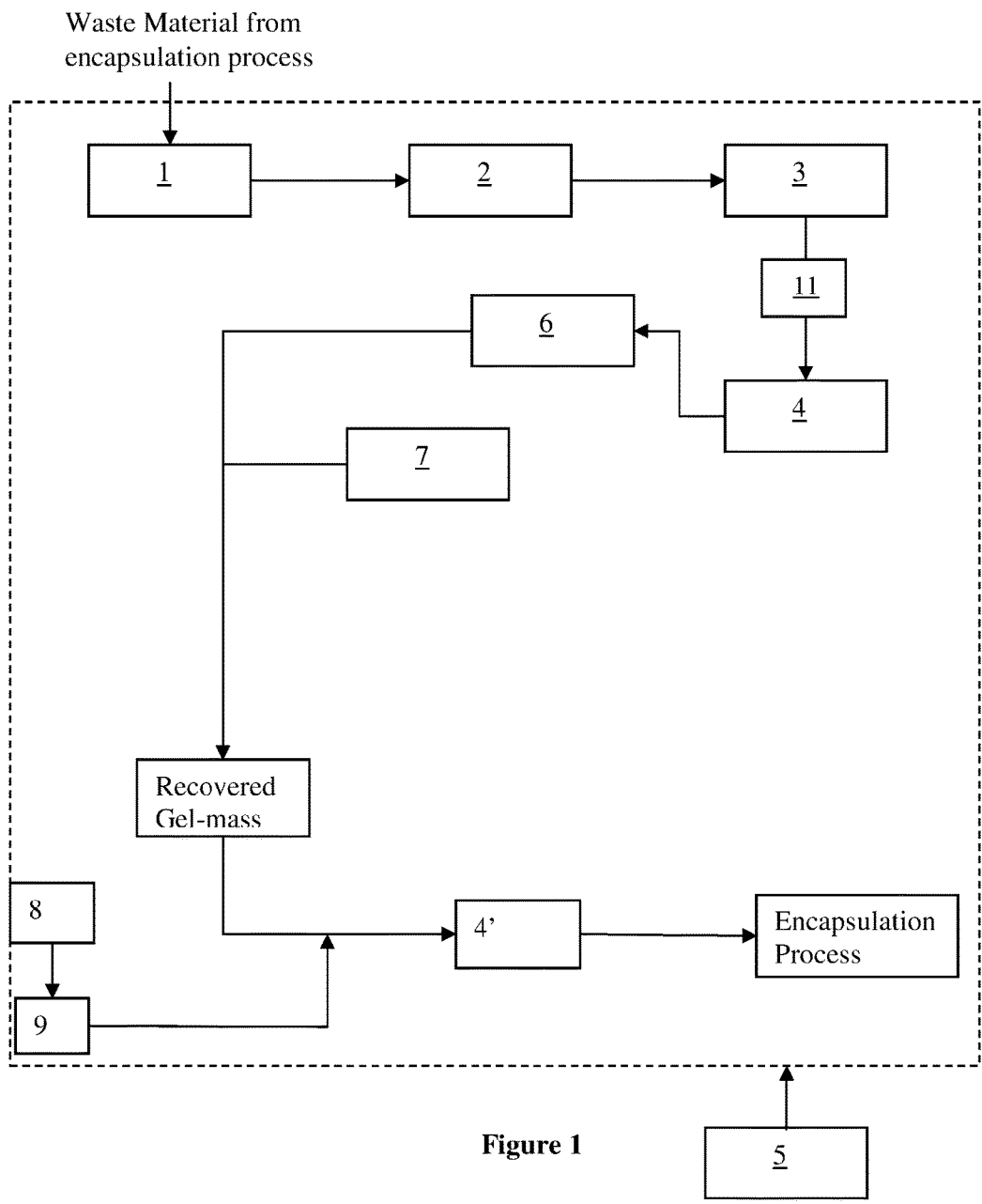
FIG. 1 is a schematic diagram showing a system for recovering gel-mass from a gel-mass-containing waste material from an encapsulation process for encapsulating a product according to one embodiment of the present invention.

For illustrative purposes, the principles of the present invention are described by referencing various exemplary embodiments. Although certain embodiments of the invention are specifically described herein, one of ordinary skill in the art will readily recognize that the same principles are equally applicable to, and can be employed in, other systems and methods. Before explaining the disclosed embodiments of the present invention in detail, it is to be understood that the invention is not limited in its application to the details of any particular embodiment shown. Additionally, the terminology used herein is for the purpose of description and not for limitation. Furthermore, although certain methods are described with reference to steps that are presented herein in a certain order, in many instances, these steps can be performed in any order as may be appreciated by one skilled in the art; the novel method is therefore not limited to the particular arrangement of steps disclosed herein.

It must be noted that as used herein and in the appended claims, the singular forms "a", "an", and "the" include plural references unless the context clearly dictates otherwise. Furthermore, the terms "a" (or "an"), "one or more", and "at least one" can be used interchangeably herein. The terms "comprising", "including", "having" and "constructed from" can also be used interchangeably.

Unless otherwise indicated, all numbers expressing quantities of ingredients, properties such as molecular weights, percentages, ratios, reaction conditions, temperature, and so forth used in the specification and claims are to be understood as being modified in all instances by the term "about," whether or not the term "about" is present. Accordingly, unless indicated to the contrary, the numerical parameters set forth in the specification and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements.

It is to be understood that each component, compound, substituent, or parameter disclosed herein is to be interpreted as being disclosed for use alone or in combination with one or more of each and every other component, compound, substituent, or parameter disclosed herein.

It is also to be understood that each amount/value or range of amounts/values for each component, compound, substituent, or parameter disclosed herein is to be interpreted as also being disclosed in combination with each amount/value or range of amounts/values disclosed for any other component(s), compounds(s), substituent(s), or parameter(s) disclosed herein and that any combination of amounts/values or ranges of amounts/values for two or more component(s), compounds(s), substituent(s), or parameters disclosed herein are thus also disclosed in combination with each other for the purposes of this description.

It is further understood that each lower limit of each range disclosed herein is to be interpreted as disclosed in combination with each upper limit of each range disclosed herein for the same component, compounds, substituent, or parameter. Thus, a disclosure of two ranges is to be interpreted as a disclosure of four ranges derived by combining each lower limit of each range with each upper limit of each range. A disclosure of three ranges is to be interpreted as a disclosure of nine ranges derived by combining each lower limit of each range with each upper limit of each range, etc. Furthermore, specific amounts/values of a component, compound, substituent, or parameter disclosed in the description or an example is to be interpreted as a disclosure of either a lower or an upper limit of a range and thus can be combined with any other lower or upper limit of a range or specific amount/value for the same component, compound, substituent, or parameter disclosed elsewhere in the application to form a range for that component, compound, substituent, or parameter.

Figure 2:
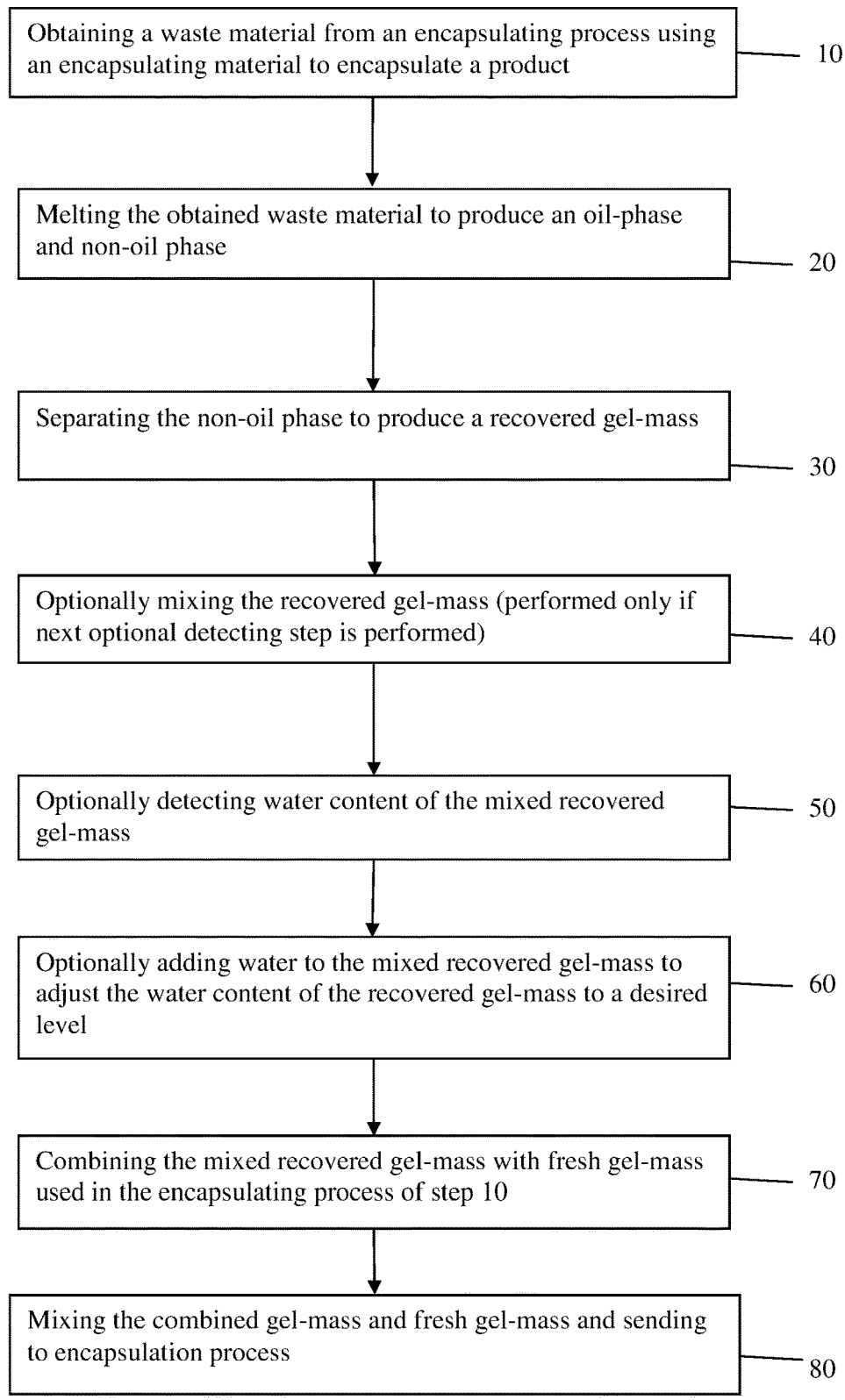
FIG. 2 is a flow chart showing a process for recovering gel-mass from a gel-mass-containing waste material according to one embodiment of the present invention.

In one aspect, the present invention provides a gel-mass recovery system as shown in FIG. 1 and a process as shown in FIG. 2 for recovering gel-mass from a gel-mass-containing waste material generated from an encapsulation process using an encapsulating material to encapsulate a product. The system comprises a heated accumulator 2 for melting 20 the gel-mass-containing waste material to provide a molten waste material and separating the molten waste material into an oil phase containing lubricating oil, other oil-phase miscible material, and a non-oil phase containing gel-mass.

Mangle rolls 1 may optionally be employed to preprocess and feed the gel-mass-containing waste material to the heated accumulator 2. A pumping system 3 transports the recovered gel-mass from the heated accumulator 2 to an optional mixer 4 to assure uniformity of the recovered gel-mass prior to presentation to an optional moisture sensor 6, and then to an optional water dosing unit 7. Fresh gel-mass from gel supply 8 is mixed in desired proportion with the recovered gel-mass through a mixer 4' to be used as input of the encapsulation process. A control system 5 can be employed to control operation of the gel-mass recovery system, or the system may be designed to work with a less sophisticated relay logic system.

The gel-mass-containing waste material may be generated from an encapsulation process for making a softgel capsule containing a pharmaceutical or a dietary supplement. It is contemplated that waste materials from other technologies and processes that require strict controls on material traceability and that can be suitably separated and recombined may also be used in the present invention. Examples of other types of processes that may benefit from the present invention include waste materials from cosmetic softgels and paintball softgels. Softgel capsules are typically produced from sheets of gel-mass ribbon. The skeleton of the ribbon (gel net) that remains after capsules have been cut therefrom is one form of a gel-mass-containing waste material from which gel-mass may be recovered for reuse in the same encapsulation process for the same pharmaceutical or dietary supplement lot. At times in the encapsulation process when capsules are not being manufactured, the entire gel-mass ribbon produced by the encapsulation process becomes waste material commonly known as slugging.

There may be many components in a typical gel-mass-containing waste material from an encapsulation process. The gelatin may be an important component in the waste material. Very often a softening agent is added to the encapsulating material to plasticize the gel-mass when softgel shells are desired. Commonly used softening agents include glycerin, sorbitol, and other similar polyols.

Additionally, coloring agents and preservatives may also be incorporated into the encapsulating materials. Common coloring agents include brilliant blue, tartrazine and sunset yellow, particularly D&C Yellow Aluminum Lake #10, D&C Red Aluminum Lake #20, F, D&C Red Aluminum Lake #40 and the like. Common preservatives include methylparaben, propylparaben, and sorbic acid.

The most prevalent contaminant in the gel-mass-containing waste material is typically a lubricating oil. Lubricating oils are used to coat gel-mass ribbons to allow the gel-mass ribbons to thread through the encapsulation equipment without adhesion of the gel-mass ribbon to these surfaces, minimize adhesion of the gel net to the stripper rollers, and minimize clumping of finished capsules. In addition, the lubricating oils may be used to form a liquid seal between the gel-mass ribbons and the injection wedge. This seal is used to prevent air from entering the capsules as they are formed. Lubricating oils that are often found in the gel-mass-containing waste materials include mineral oils and medium chain triglycerides. Exemplary medium chain triglycerides include vegetable oils and animal fats. The lubricating oils are a major component in the gel-mass-containing waste material that needs to be removed from the gel-mass during the gel-mass recovery process of this invention.

The gel-mass-containing waste materials may also contain trace amount of one or more of the components that are encapsulated in the encapsulation process. For example, the gel-mass-containing waste material may contain some amount of the active pharmaceutical ingredient(s) and/or other inactive ingredients formulated with the active pharmaceutical ingredients to form the fill material that is encapsulated in the softgel capsules.

The methods taught in the prior art strive to recover gelatin from the gel-mass-containing waste material and remove all of the other components as much as practical to create a substantially pure gelatin in order to reduce the risk of cross-contamination. The prior art methods typically require additional purification steps that add significant cost to the recovery process and may reduce the amount of gelatin recovered since some gelatin is inevitably lost during these additional purification steps. The gel-mass recovery system and process of the present invention reuses the recovered gel-mass for encapsulating the same lot of the same product as in the encapsulation process from which the gel-mass-containing waste material was generated. Thus, in the present process it is not necessary to remove some of the components in the gel-mass, such as, for example, the softening agents, preservatives, coloring agents and residual fill components. Small amounts of residual active pharmaceutical ingredient, lubricating oil or excipient may remain in the recovered gel-mass as long as they are at insignificant levels thus rendering the recovered product acceptable for re-use to encapsulate the same active pharmaceutical ingredient.

In the present invention, some embodiments remove only the oil phase containing the lubricating oils from the gel-mass-containing waste materials before the recovered gel-mass is reused to encapsulate the same lot of the same product. This method significantly simplifies the gel-mass recovery process and reduces the cost of recovering gel-mass from the gel-mass-containing waste material. In addition, there is no risk of cross-contamination and the lot traceability of the encapsulated product remains intact because the recovered gel-mass is reused for encapsulation of the same lot of the same product as in the encapsulation process from which the gel-mass-containing waste material was obtained.

To initiate the gel-mass recovery process, the gel-mass-containing waste material is retrieved 10 from the encapsulation process. One means for retrieving 10 the waste material employs mangle rolls 1. For example, a gel-mass net waste material from the encapsulation process may be retrieved 10 from die rolls of an encapsulation machine using mangle rolls 1. Other suitable means for transporting the gel-mass-containing waste material to accumulator 2 may also be employed. Mangle rolls 1 may be, for example, a pair of knurled cylinders that grasp and pull the gel-mass net from the die rolls after the gel-mass net has been formed in the encapsulation process.

In some embodiments, mangle rolls 1 are configured to be sanitary. For example, sanitary mangle rolls may be made of a cleanable material such as stainless steel or plastic, and employ sealed bearings and seals to prevent unnecessary contamination of the gel-mass-containing waste material by ensuring that the mangle rolls are sanitary. In some embodiments, there may be a mangle roll assembly comprising more than one pair of mangle rolls 1 for successively transporting the gel-mass-containing waste material to the heated accumulator 2. Alternatively, the gel-mass-containing waste material may be accumulated in containers and manually or with aid of equipment transported and fed into the accumulator 2.

Mangle rolls 1, when present, are associated with a drive gear which is coupled to a drive motor such that the mangle rolls 1 rotate at a suitable speed to retrieve 10 the gel-mass-containing waste material from the die rolls. Mangle rolls 1 may each include meshing curvilinear and elongated teeth, respectively, which engage one another to grasp the gel-mass-containing waste material there between.

The gel-mass-containing waste material is passed from mangle rolls 1 to a heated accumulator 2, which melts 20 the gel-mass-containing waste material to provide molten waste material and acts as a reservoir for the molten waste material. Heated accumulator 2 may be a tank or vessel of any shape, as long as it has a sufficient size and geometry to ensure that the molten waste material has sufficient residence time to separate into a two-phase composition including an oil phase comprising lubricating oils and a non-oil phase (recovered gel-mass) containing the gel-mass and other components such as preservatives and coloring agents that are immiscible in the lubricating oils.

Heated accumulator 2 may be heated by any means known to a person skilled in the art in order to maintain accumulator 2 at a desired temperature. In one embodiment, a heating jacket may be associated with accumulator 2 to provide heat to accumulator 2. In some embodiments, a microwave heating device or a radio frequency heating (also known as dielectric heating) device may be used. In another embodiment, an immersion heater may be located in accumulator 2 to maintain accumulator 2 at a desired temperature. In yet another embodiment, the temperature of accumulator 2 may be controlled using a combination of external heating and insulation to prevent heat dissipation. Heated accumulator 2 may be maintained at a temperature in a range of from about 45° C. to about 90° C., or more preferred 50° C. to 75° C., and most preferred 60° C. to 70° C.

In some embodiments, heated accumulator 2 may be constructed to receive and melt 20 the solid gel-mass-containing waste material at a first receiving end of heated accumulator 2 and adapted to allow the molten waste material to separate into the two-phase mixture at the other end of heated accumulator 2. In this embodiment, a continuous, controlled flow of waste material may be maintained going from the receiving end of accumulator 2 to the other end. The flow rate is controlled to ensure sufficient residence time of the molten waste material for it to separate into the two-phase mixture. Such a design may enable heated accumulator 2 to receive gel-mass-containing waste material from mangle rolls 1 and provide a separated two-phase mixture on a continuous basis.

In one embodiment, heated accumulator 2 has an overflow outlet proximate to an upper portion thereof which may be used to drain excessive molten waste encapsulating material from heated accumulator 2. This overflow outlet can accommodate situations where heated accumulator 2 receives gel-mass-containing waste material at a rate exceeding the rate of removal of the two-phase molten waste material from accumulator 2, or removal of excess oil-phase as it accumulates in accumulator 2. Excess waste material provided to accumulator 2 could result in contamination of the gel-mass to be reused. Thus, the overflow outlet may be provided to drain excess waste material to another reservoir to prevent adverse consequence of overflow. The excess waste material may later be cycled back to heated accumulator 2 when the level of gel-mass-containing waste material in heated accumulator 2 permits. In some embodiments, there may be an overflow for the accumulation of oil-phase. There may be a divert valve post water dosing unit 7 that will dump any excess recovered gel-mass.

The oil phase in the heated accumulator 2 includes the lubricating oils and any other components that are dissolved in the oils. The non-oil phase contains mostly gel-mass and some other components that are not dissolved in the oil phase. Since the lubricating oils are less dense than gel-mass, the oil phase will separate to the top of the non-oil phase.

In some embodiments, the gel-mass-containing waste material has emulsification potential. In these embodiments, heated accumulator 2 may be provided with additional features that are designed to minimize the amount of shear stress applied to the molten waste material since shear stress tends to promote emulsification of immiscible components (e.g., lubricating oils) with the non-oil phase. In one embodiment, heated accumulator 2 is adapted to move the molten waste material at a low speed to promote a laminar flow pattern to reduce or prevent emulsification of immiscible components with the non-oil phase. Generally, laminar flow occurs at low Reynolds numbers, where viscous forces are dominant. Laminar flow is characterized by smooth, constant fluid motion. On the other hand, turbulent flow occurs at high Reynolds numbers and is dominated by inertial forces, which tend to produce chaotic eddies, vortices and other flow instabilities.

In some embodiments, a displacement liquid may be introduced into heated accumulator 2. Displacement liquid is used to facilitate separation of the oil phase and non-oil phase. The displacement liquid is immiscible with the molten gel-mass. This displacement liquid serves to displace air and lubricating oils from the gel-mass-containing waste material. It also improves heat conduction to the solid gel-mass-containing waste material in order to reduce the melting time required for melting the gel-mass-containing waste material. To reduce the melting time, the displacement liquid is heated to a temperature that is higher than the melting temperature of the gel-mass-containing waste material to facilitate heat transfer from the displacement liquid into the waste encapsulating material to enhance melting. In these embodiments, the gel-mass-containing waste material can receive heat from heated accumulator 2, as well as from the heated displacement liquid, hence reducing the total melting time required to provide the molten waste material.

The displacement liquid is a liquid miscible with oil. Without any affect on surface tension, the less dense the displacement liquid the better, in order to provide a larger density gradient with respect to the gel-mass. In one embodiment, the displacement liquid may be the lubricating oil in order to avoid adding additional materials into the waste materials.

The displacement liquid may be heated to a temperature in the range of from about 50° C. to about 90° C., or more preferably 60° C. to 80° C., or most preferably 65° to 75° C.

In some embodiments, heated accumulator 2 has an upper heating zone for maintaining the displacement liquid at the desired temperature, while a lower section of heated accumulator 2 has a separate heating zone for directly heating the recovered gel-mass. In one embodiment, the temperature in the upper heating zone is higher than the temperature of the lower section of heated accumulator 2, and both of these temperatures are at or above the melting temperature of the gel-mass.

In some embodiments, heated accumulator 2 may be placed in a low pressure or vacuum environment, for example at a reduced pressure lower than one atmosphere. This may be done either continuously or intermittently. Vacuum can help to remove entrained air in both the oil phase and the non-oil phase.

In some embodiments, centrifugal separation techniques can be used to aid the separation of the non-oil phase from both air and lubricating oils. Such centrifugal separation techniques can minimize water loss and emulsification of the lubricating oils into the non-oil phase, in comparison with a vacuum system. One example of a suitable centrifugal separation technique involves introducing the molten waste material into a spinning cylinder through the center axis of the spinning cylinder. The spinning cylinder may contain a displacement liquid that is immiscible with the non-oil phase. There is no air pocket in the cylinder so as to minimize the amount of shear stress experienced by the molten waste material. The heavier non-oil phase is separated to the outside of the cylinder due to centrifugal force where it can be siphoned off. The speed of centrifuge rotation can be adjusted to provide a high degree of separation between oils, air, and gel-mass. The viscosity of the immiscible liquid can also be adjusted to minimize shear stress applied to the non-oil phase.

In some embodiments, heated accumulator 2 includes a heating zone and a settlement zone. In the heating zone, the gel-mass-containing waste material is melted and the molten waste material flows to the settlement zone. The heating zone may have a temperature in the range of from about 50° C. to about 90° C., or more preferably 60° C. to 80° C., or most preferably 65° to 75° C. The settlement zone may have a temperature in a range of from about 35° C. to about 70° C., or 45° C. to about 75° C., or more preferred 55° C. to 65° C. A retention grate may optionally be placed between the heating zone and settlement zone to prevent unmelted waste material from passing to the settlement zone.

The molten waste material will settle and separate into an oil phase and a non-oil phase in heated accumulator 2. At least one sensor may be used to detect the presence of the two phases or to detect an interface between the non-oil phase and the displacement liquid. Signals from the at least one sensor can be used by the control system 5 to control one or more pumps in the pumping system 3 and/or one or more mixers 4, or to emit an alarm or warning to an operator of the recovery system.

Many types of sensors, including capacitance sensors, pressure sensors, buoyancy sensors, sight gauges, differential temperature sensors, and conductivity sensors, may be used to detect the levels of different phases in heated accumulator 2. For example, fiber-optic sensors can be used together with an optical time domain reflectometer for liquid-immersion detection, as described in U.S. Pat. No. 8,731,342. Also, sensors that detect differences in electrical characteristics between an oil phase and a non-oil phase, such as the sensors described in U.S. Pat. No. 6,419,807, may be used in the present invention. Multiple sensors, such as sensor arrays, may be used to detect the presence and/or boundary of the oil phase and non-oil phase.

Once the molten waste material has settled into an oil phase and a non-oil phase, the two phases are separated. The oil phase may be retrieved from heated accumulator 2 using, for example, an oil skimmer. The non-oil phase is also retrieved 30 from accumulator 2 to be further processed for reuse in encapsulating the same lot of the same product as in the encapsulation process from which the gel-mass-containing waste material was generated.

The oil phase, retrieved from top portion of the molten waste material, typically contains the lubricating oil (coating oil) for gel-mass ribbons. The retrieved oil phase may be discarded, because contamination of the lubricating oil in the oil phase with residual gelatin and active ingredients may render it uneconomical to purify and recycle the oil for reuse.

In some optional embodiments, the oil phase may be sent to a recycling system to recover the lubricating oils therein. Suitable oil recycling systems are known in the prior art. The lubricating oils recovered from the oil phase may be reused to coat the gel-mass ribbons. These lubricating oil recycling systems may use a variety of techniques including fractional distillation, short path distillation, and reverse osmosis. Also, a series of distillations may be used in some embodiments. A fractionating column may be used to essentially perform a large number of successive distillations without the necessity of actually collecting and redistilling the various fractions. The fractionating column may be packed with glass beads, glass helices, metal screens or ceramic saddles to effect fractionation.

Short path distillation is especially suitable for an oil phase that cannot be distilled by ordinary distillation methods because (1) the oil phase is viscous, and thus condensed vapors tend to plug the distilling column or condenser;

and/or (2) the vapors of the oils are extremely susceptible to condensation. Short path distillation differs from ordinary distillation in that a condensed vapor flows to the distillate receiver or collector, use of a very low pressure (high vacuum) in the system favors vaporized molecules reaching the condensing surface without collision with other molecules to cause premature condensation, there is a very short distance between the surface of the evaporating liquid and the condenser surface, and the distillate has a very short residence time so that thermal degradation is reduced or prevented.

One suitable short path distillation apparatus includes a rotating still. The oil phase is fed into the rotating still and distributed evenly and thinly over a heated evaporating surface. The distributed oil phase distills in a short time under a low pressure and the vapor condenses and runs into a collector. The pressure is controlled to collect the distillate at the condenser. The pressure can be as low as 1 µm Hg.

The non-oil phase in heated accumulator 2 may be retrieved 30 through a heated transfer conduit and driven by a pumping system 3 to prevent solidification of the molten gel-mass in transport. A temperature in the transfer conduit of, for example, from about 35° C. to about 80° C., or from about 40° C. to about 70° C., or from about 55° C. to about 65° C., is suitable for transporting the non-oil phase. The retrieved non-oil phase is mostly gel-mass, and thus is referred to as the "recovered gel-mass" herein. In some embodiments, the recovered gel-mass may not require further purification before reuse.

In some embodiments, the retrieved gel-mass may still include an amount of residual lubricating oils that is too high for direct reuse. In such cases, the present invention optionally uses any known technique to remove the residual lubricating oils and/or any other contaminants from such a gel-mass. Examples include filtration and diafiltration, either batchwise or continuous.

Hot filtration may be performed at a temperature of from about 40° C. to about 70° C. Suitable filtration equipment may include plate filters, nutche filters of the Rosenmund type and cartridge filters. The hot filtration may involve liquid:liquid centrifugation, sub-micro/micro-filtration, liquid:liquid coalescers, absorbents and filter aids such as diamataceous earth, activated carbon, clay or activated clay, colloidal silica, porous acrylic resins, and oil soluble salts to break an emulsion that may be present in the gel-mass.

The recovery system of the present invention includes a pumping system 3, having one or more pumps for retrieving 30 the non-oil phase from heated accumulator 2, optionally transporting the recovered gel-mass to the optional purification apparatus 11, and delivering the recovered gel-mass to an optional mixer 4. The optional purification apparatus 11 may be, for example, a filter for removing unwanted particles larger than 50 microns. Suitable pumps include positive displacement pumps selected from gear pumps, lobe pumps, sine pumps, worm pumps, helical worm pumps, piston pumps and archimedes screws.

The recovered gel-mass is sent to an optional mixer 4, which assures substantially uniform blending/mixing 40 of the gel-mass prior to optional measurement of the water content in the gel-mass by an optional moisture sensor 6. The optional mixer 4 is preferably a static mixer. Static mixers are typically constructed of a series of alternating baffles, of varying geometries, usually consisting of right-handed and left-handed mixing baffles disposed in a conduit to perform continuous division and recombination of the fluid in an overlapping manner. Such division and recombination cause layers of the fluid being mixed 40 and eventually the fluid becomes a uniform fluid. Static mixers using this principle are very effective, especially with high viscosity fluids.

The optional mixer 4 is preferably configured as an in-line mixer provided in the middle of a pipeline or conduit. Mixer 4 may be stationary such that fluid flowing through the pipeline or conduit is mixed 40 as it passes through the optional mixer 4. In one embodiment, an in-line static mixer 4 includes a plurality of mixer baffle segments positioned in a conduit. The plurality of mixer baffle segments defines a direction of flow through the static mixer. The mixer baffle segments may be configured to divide and rotate the fluid flow. Each of the mixer baffle segments may consist of a plurality of planar baffle plates interconnected together to form pairs of adjacent baffle plates oriented generally perpendicular to each other along adjoining edges.

After the gel-mass is sufficiently mixed to provide a substantially uniform recovered gel-mass, an optional moisture sensor 6 may be employed to detect 50 the water content of the gel-mass. Several types of moisture sensors 6 may be used in the present invention. One suitable type of moisture sensor 6 is an electric property-based sensor, which measures water content in a liquid based on the change of an electric property as detected by a specially-designed resistor or capacitor as described in U.S. Pat. No. 5,040,090. Another suitable type of moisture sensor 6 is an optical fiber moisture sensor that detects end-point membrane light absorption, evanescent wave optical absorption, or evanescent wave excited fluorescence. In addition, an array of optical fiber sensors can be made in a single fiber to measure water content in different locations of the gel-mass at the same time. In one embodiment, the moisture sensor 6 is a refractometer.

Both the pumping system 3 and mixers 4 may be heated to prevent gel-mass solidification. The temperatures for the heated pumping system 3 and heated mixers 4 may be the same or different, and may be in the range of from about 35° C. to about 80° C., or from about 50° C. to about 70° C., or from about 55° C. to about 65° C.

Moisture sensor 6 transmits the water content of the gel-mass to control system 5. Water often evaporates from the gel-mass ribbon during encapsulation. Thus, the water content of the recovered gel-mass may be below the water content of original encapsulating material. In some embodiments, it is necessary to add water in step 60 to the gel-mass to compensate for the lost water by using a water dosing system 7. The amount of water to be added may be calculated by control system 5 based on the water content in the gel-mass and the desired water content for the original encapsulating material. After water is added at step 60, the gel-mass may be mixed again. Alternatively, or additionally, water may be added prior to the mixing step 80.

The gel-mass recovery system of the present invention may use a plurality of mixers. However, the mixer 4' is the only required mixer in this system, which mixer 4' is used to mix the recovered gel-mass with fresh gel-mass. If compensation for lost water is employed, a mixer may be used to mix the recovered gel-mass prior to measuring water levels in the recovered gel-mass, and an additional mixer could be used downstream of the addition of water unless the water is also added at the same point that the recovered gel-mass and fresh gel-mass are blended.

Control system 5 may receive signals indicative of encapsulation speed, the temperature in heated accumulator 2 or different zones thereof, the temperature of the non-oil phase, the water content in the gel-mass, and perhaps other parameters as well. Control system 5 may include at least one CPU and a user interface. In another embodiment, the system may be configured to use calibrated pumps and relay logic instead of a CPU.

Control system 5 is operably connected to the encapsulation machine, heated accumulator 2, pumping system 3, an optional mixer 4, moisture sensor 6, and water dosing system 7. Therefore, control system 5 can be used to monitor and/or control the operation of the recovery system and make adjustments to operating conditions of individual system components, e.g., by adjusting pump speed, reacting to the encapsulation machine speed, the temperature of heated accumulator 2, mixer speed, etc. These adjustments can be made automatically based on pre-programed relationships between various components and pre-determined operating conditions for each component. Control system 5 may use programmable logic control (PLC) or relay logic for control of the components of the recovery system.

Once it is determined that the water content of the gel-mass is at a desirable level, with or without addition of water, and the gel-mass has been substantially purified except for some trace amounts of lubricating oils and encapsulated product, the gel-mass is ready for recycling to the encapsulating process. Since the lubricating oils and encapsulated product are already part of capsules, and are of the same lot as the encapsulated product in the encapsulation process (e.g., active ingredients), there are no concerns for cross contamination or loss of lot traceability as a result of any trace amounts of these components being present in the recovered gel-mass.

In situations where trace amounts of lubricating oils and encapsulated product present in the capsule shell may have one or more long term effects on the performance of the gel, such as causing crosslinking of the gel-mass, the recovery system may be configured in a manner such that the recovered gel-mass is added back to only one ribbon, thereby assuring that one side of the capsules is free of recycled material and thus allow for proper capsule rupture and medicament release.

To recycle 70 the recovered gel-mass, it is combined with fresh encapsulating material from gel supply 8 and pumped by a pump 9 through a mixer 4' to assure uniformity as an encapsulating material and then sent to the gel box. The blend ratio between recovered gel-mass and fresh encapsulating material is limited based more or less on die efficiency. It is possible to use 100% recycled gel-mass for a subsequent encapsulating operation. However, in a typical continuous process a blend ratio equivalent to the die efficiency would normally be employed. For example, if a die had an efficiency of 80%, then the blend ratio of fresh:recovered gel mass would be 80:20, in order to ensure that the supply of recovered gel mass is not depleted during the process. If carried out at a constant blend ratio, the successive accumulated recovered gel-mass drops according to a first order exponential. Therefore, the gel-mass recovery process may be run concurrently and in real time as part of an encapsulation process with a stable composition of recovered gel-mass to fresh gel-mass.

In some embodiments, the recovery system of the present invention may be integral to the encapsulating machine. In such embodiments, the gel-mass-containing waste material is transported directly to the recovery system and the recovered gel-mass is recycled 70 back to the encapsulation process and combined with fresh encapsulating material to be used for encapsulation of the same lot of the same product. This is an in-line process.

In some embodiments, at least a portion of the recovery system may be positioned external to the encapsulating machine. For example, the heated accumulator 2 may be located away from the encapsulating machine to allow easier implementation of centrifugal separation or application of a vacuum to the content in the accumulator 2.

In another aspect, the present invention provides a process for recovering gel-mass from a gel-mass-containing waste material (FIG. 2). Suitable apparatus for carrying out the process has been described above. The process comprises the steps of:
  a. retrieving 10 a waste encapsulating material from an encapsulation process using an encapsulating material to encapsulate a product,
  b. melting 20 the retrieved waste encapsulating material to produce an oil phase and a non-oil phase,
  c. separating 30 the non-oil phase from the oil phase to produce a non-oil phase recovered gel-mass,
  d. optionally mixing 40 the recovered gel-mass,
  e. optionally detecting 50 the water content of the mixed recovered gel-mass,
  f. optionally adding 60 water to the mixed gel-mass to bring the water content of the gel-mass to a desired level,
  g. combining 70 the recovered gel-mass with fresh-gel mass, and
  h. mixing 80 the gel-mass to be combined with fresh encapsulating material and dispensed to the casting gel-box.

The process of the present invention has the advantages of eliminating cross-contamination and retaining the lot traceability of the encapsulation products which result from using the recovered gel-mass as a recycle material for encapsulation of the same lot of the same product(s). In addition, the recovered gel-mass of the present invention has a minimal difference in gel-mass aging in comparison with the fresh encapsulating material since the recovered gel-mass is processed with the fresh gel-mass within a short time frame.

In some embodiments, including in a typical in-line process, it takes approximately 2-5 minutes for the gel-mass to travel from the casting gel-box that initiates the encapsulation process shown in FIG. 1 to the accumulator 2, about 4-20 minutes for the accumulator 2 to accumulate a sufficient amount of gel-mass, about 4-20 minutes to transfer the accumulated gel-mass from the accumulator 2 back to the gel-box. Thus, it takes a total of about 8-45 minutes for the gel-mass to run a full cycle. If an off-line accumulator 2 is used, it probably takes additional 2 hours. If the gel-mass recovering process is run in a batch mode, it probably takes about 6 hours for the gel-mass to run a full cycle. The gel-box is typically located at the output of mixer 4' and initiates the encapsulation process by forming the gel-mass ribbon.

Further, the gel-mass recovery process of the present invention may be carried out as a continuous process to provide the recovered gel-mass to the encapsulating machine for encapsulation of the same lot of the same product.

The following examples are illustrative, but not limiting, of soft gel-mass capsules made by a process in accordance with the present disclosure. Other suitable modifications and adaptations of the variety of conditions and parameters normally encountered in the field, and which are obvious to those skilled in the art, are within the scope of the disclosure.

EXAMPLES

Example 1

Gel-netting from Omega-3 encapsulation was used to manufacture placebo capsules. This example confirmed that a machinable and aesthetically acceptable gel-mass could be attained by simple melting of the gel-netting and gravity separation of residual oils and air.

The placebo capsules appeared clear and free of air. In addition there was no detectable odor associated with Omega-3 oil that was present in the Omega-3 gel-netting used for this example. The air separated out as foam on the surface of the molten gel-mass, and the residual oils also separated out from the molten gel-mass and accumulated on the surface thereof. These demonstrate the feasibility of separating residual oils and air from a molten gel-mass using gravity for materials with slightly different densities. This example also demonstrates that the molten gel-mass does not emulsify these components, which would make the components difficult to separate, especially if the gel-mass were to be subjected to shear stress while in a molten state.

Example 2

Oil displacement studies were performed. A heated accumulator was configured with a heated grate at the top and filled with medium chain triglyceride oil (MCT). Gel net was introduced into the accumulator at an encapsulation machine speed equivalent to 1.5 times the normal encapsulation machine speed. It was observed that the gel net melted on contact with the heated oil and heated grate, and sank to the bottom of the accumulator. As the study continued, and the gel net continued to be added, excess MCT was displaced from the top of the accumulator to waste. The gel-mass was harvested from the bottom of the accumulator. The recovered gel-mass was free of visible air and oil. This example demonstrated that the accumulator was effective in melting and separating the oil-phase and non-oil phase components of the waste stream at and above expected delivery rates of the waste stream, and the MCT oil was effective in speeding the melting of the waste stream and in displacing air and oil from the waste stream to produce recovered gel-mass suitable for re-use.

All documents mentioned herein are hereby incorporated by reference in their entirety or alternatively to provide the disclosure for which they were specifically relied upon.

The foregoing embodiments are susceptible to considerable variation in practice. Accordingly, the embodiments are not intended to be limited to the specific exemplifications set forth herein. Other embodiments of the present disclosure will be apparent to those skilled in the art from consideration of the specification and practice of the embodiments disclosed herein. It is intended that the specification and examples be considered as exemplary only, with a true scope of the disclosure being indicated by the following claims.

The applicant(s) do not intend to dedicate any disclosed embodiments to the public, and to the extent any disclosed modifications or alterations may not literally fall within the scope of the claims, they are considered to be part hereof under the doctrine of equivalents.

What is claimed is:

1. An encapsulation process including recovery of gel-mass from a gel-mass-containing waste material, comprising the steps of:
   (a) encapsulating a product thereby producing an encapsulated product and a gel-mass-containing waste material;
   (b) retrieving the gel-mass-containing waste material after said encapsulating step with sanitary mangle rolls;
   c) introducing the gel-mass-containing waste material into a displacement liquid which is an oil-miscible liquid heated to a temperature in a range of from 50° C. to 90° C. to facilitate melting the gel-mass-containing waste material to produce an oil phase and a non-oil phase;
   (d) separating the non-oil phase to provide a recovered gel-mass;
   (e) combining the recovered gel-mass with fresh encapsulating material to provide a combined encapsulating material; and
   (f) feeding the combined encapsulating material to step (a) for encapsulation of an additional product from a same lot of the product which was encapsulated in the step (a) that produced the gel-mass-containing waste material from which the recovered gel-mass of step (d) was obtained.

2. The process of claim 1, further comprising the step of mixing the recovered gel-mass prior to combining it with fresh encapsulating material to provide a mixed recovered gel-mass.

3. The process of claim 2, further comprising the step of detecting a water content of the mixed recovered gel-mass.

4. The process of claim 3, further comprising the step of adding water to the mixed recovered gel-mass to adjust the water content of the mixed recovered gel-mass.

5. The process of claim 1, wherein the melting step is carried out at a reduced pressure lower than one atmosphere.

6. The process of claim 1, wherein the displacement liquid is heated to a temperature in a range of from 60° C. to 80° C.

7. The process of claim 1, further comprising the step of detecting a presence of the oil phase and non-oil phase interface.

8. The process of claim 7, wherein the detecting step is carried out using at least one sensor selected from capacitance sensors, pressure sensors, buoyancy sensors, differential temperature sensors, and conductivity sensors.

9. The process of claim 1, further comprising the step of recovering lubricating oil from the oil phase using a technique selected from fractional distillation, short path distillation and reverse osmosis.

10. The process of claim 1, further comprising the step of filtering the gel-mass using a filtration technique selected from pressure filtration, hot filtration or diafiltration.

11. The process of claim 1, wherein the mangle rolls comprise a pair of knurled cylinders.

12. The process of claim 1, wherein the mangle rolls employ sealed bearings.

13. The process of claim 1, wherein the gel mass-containing waste material is recovered by a single pair of mangle rolls.

14. The process of claim 1, wherein the gel mass-containing waste material is recovered by more than one pair of mangle rolls.

15. The process of claim 1, wherein the mangle rolls include meshing curvilinear and elongated teeth configured to engage one another to grasp the gel mass-containing waste material therebetween.

* * * * *

UNITED STATES PATENT AND TRADEMARK OFFICE
CERTIFICATE OF CORRECTION

| | |
|---|---|
| PATENT NO. | : 10,465,143 B2 |
| APPLICATION NO. | : 15/345669 |
| DATED | : November 5, 2019 |
| INVENTOR(S) | : Fulper et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 74 days.

Signed and Sealed this
Twenty-eighth Day of January, 2020

Andrei Iancu
*Director of the United States Patent and Trademark Office*